United States Patent
Ning et al.

(10) Patent No.: US 8,390,989 B2
(45) Date of Patent: Mar. 5, 2013

(54) SOLID ELECTROLYTIC CAPACITOR, METHOD FOR PRODUCING SAME, AND SOLUTION FOR SOLID ELECTROLYTIC CAPACITOR

(75) Inventors: Tailu Ning, Saitama-ken (JP); Michiko Shingai, Saitama-ken (JP); Sachiko Ode, Tokyo (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 224 days.

(21) Appl. No.: 12/898,248

(22) Filed: Oct. 5, 2010

(65) Prior Publication Data
US 2011/0080691 A1   Apr. 7, 2011

(30) Foreign Application Priority Data
Oct. 6, 2009   (JP) .............................. P2009-232889

(51) Int. Cl.
*H01G 9/00*   (2006.01)

(52) U.S. Cl. ........ 361/523; 361/517; 361/519; 361/525; 361/528; 361/529

(58) Field of Classification Search .................. 361/525, 361/516–519, 523, 528–529, 530, 540; 29/25.01, 29/25.03
See application file for complete search history.

(56) References Cited

U.S. PATENT DOCUMENTS

| | | | | |
|---|---|---|---|---|
| 4,590,541 | A | * | 5/1986 | Takahashi et al. ............ 361/527 |
| 2010/0033905 | A1 | * | 2/2010 | Kobayakawa et al. ........ 361/525 |

FOREIGN PATENT DOCUMENTS

| EP | 1 993 113 A1 | 11/2008 |
|---|---|---|
| EP | 2 154 197 A1 | 2/2010 |
| JP | S63-158829 A | 7/1988 |
| JP | S63-173313 A | 7/1988 |
| JP | 07-105718 A | 4/1995 |
| JP | 2001-148331 A | 5/2001 |
| JP | 2003-037024 A | 2/2003 |
| JP | 2006-100774 A | 4/2006 |
| JP | 2009-508341 A | 2/2009 |
| JP | 2009-508342 A | 2/2009 |

OTHER PUBLICATIONS

Extended European Search Report issued on Jan. 28, 2011, in counterpart European Application No. 10186632.5, ten (10) pages.

* cited by examiner

*Primary Examiner* — Nguyen T Ha
(74) *Attorney, Agent, or Firm* — Nath, Goldberg & Meyer; Jerald L. Meyer; Sanjana Mangalagiri

(57) ABSTRACT

A solid electrolytic capacitor that is able to maintain a high capacitance and low ESR, and also exhibits a high degree of heat resistance. The solid electrolytic capacitor 10 comprises at least an anode body 11 composed of a porous material, a dielectric layer 12 formed on the surface of the anode body 11, and a cathode body 13b, wherein the solid electrolytic capacitor has a solid electrolyte layer 13a formed in contact with the dielectric layer 12, the solid electrolyte layer 13a comprises at least a hydroxy compound having three or more hydroxyl groups, and the hydroxy compound has a melting point of not less than 170° C.

14 Claims, 1 Drawing Sheet

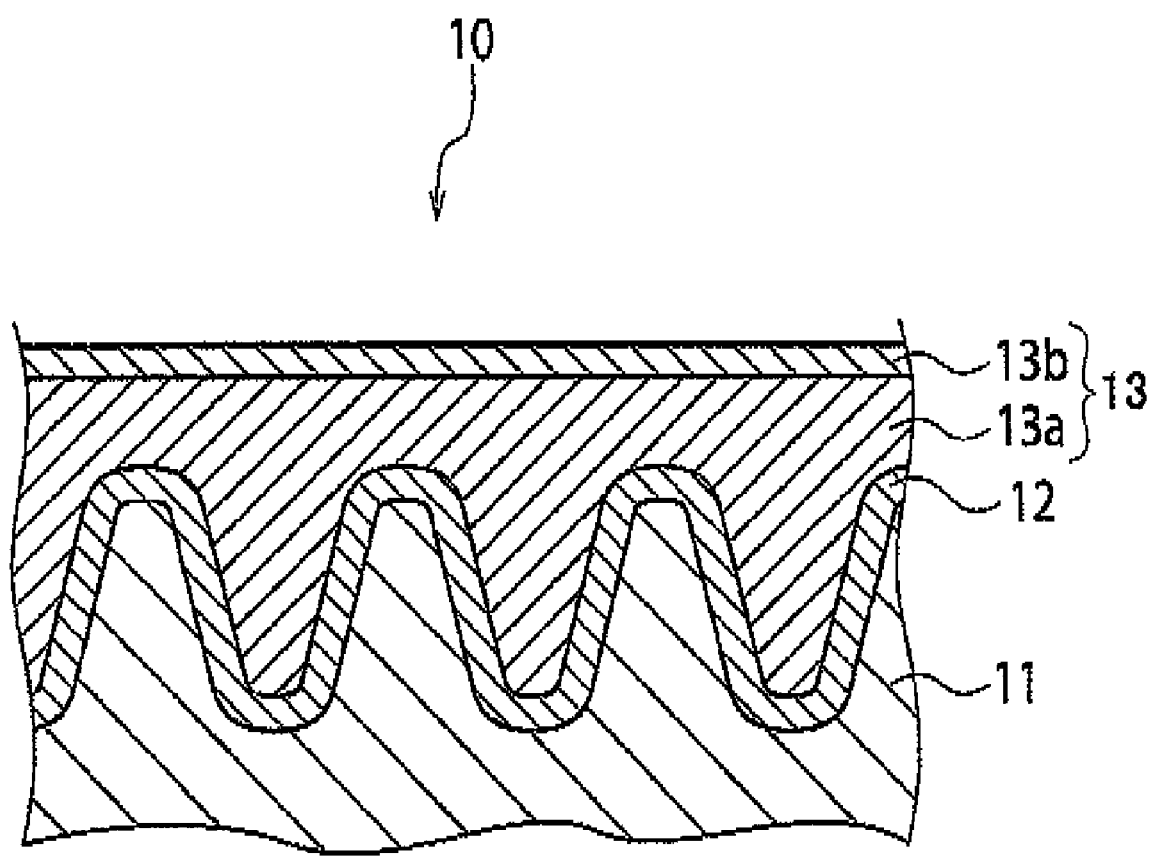

SOLID ELECTROLYTIC CAPACITOR, METHOD FOR PRODUCING SAME, AND SOLUTION FOR SOLID ELECTROLYTIC CAPACITOR

BACKGROUND OF THE INVENTION

1. Field of the Invention

The present invention relates to a solid electrolytic capacitor, a method for producing the solid electrolytic capacitor, and a solution for the solid electrolytic capacitor.

2. Description of the Related Art

In recent years, the digitization of electronic equipment has been accompanied by a growing demand for reductions in the impedance or equivalent series resistance (hereinafter, the equivalent series resistance is referred to as "ESR") within the high-frequency region of the capacitors used in the electronic equipment. Conventionally, in order to satisfy these demands, so-called functional capacitors (hereinafter abbreviated as simply "capacitors") have been used in which an oxide film of a valve metal such as aluminum, tantalum or niobium is used as a dielectric body.

As disclosed in Japanese Patent Laid-Open No. 2003-37024, the structures of these capacitors typically include an anode composed of a porous body of a valve metal, a dielectric layer formed by oxidation of the surface of the anode, a conductive solid electrolyte layer, and a cathode on which is laminated a carbon layer or a silver layer or the like. A conductive film comprising a conductive polymer may be used as the solid electrolyte layer.

Widely known methods for forming a conductive film comprising a conductive polymer include electrolytic polymerization methods in which a conductive layer composed of a manganese oxide is formed in advance on the surface of a valve metal porous body, and this conductive layer is then used as an electrode for performing the electrolytic polymerization (see Japanese Patent Laid-Open No. S63-158829), and chemical oxidative polymerization methods in which a precursor monomer that generates the conductive polymer is polymerized using an oxidant (see Japanese Patent Laid-Open No. S63-173313).

As an example of a method for forming a conductive film other than the electrolytic polymerization method and chemical oxidative polymerization method described above, Japanese Patent Laid-Open No. H07-105718 proposes a method in which aniline is subjected to a chemical oxidative polymerization in the presence of a polymer anion having a sulfo group or carboxyl group or the like, thereby forming a water-soluble polyaniline, and an aqueous solution of the polyaniline is then applied and dried to form a coating. With this method, a conductive film with a high degree of conductivity can be formed relatively easily.

The inventors of the present invention have already disclosed a capacitor comprising an anode composed of a porous body of a valve metal, a dielectric layer formed by oxidation of the surface of the anode, and a solid electrolyte formed on top of the dielectric layer, wherein the solid electrolyte is formed from a composition comprising a conductive polymer containing an added nitrogen-containing aromatic compound (PEDOT/PSS polymer dispersion) as an essential component.

Features of the composition that forms this polymer electrolyte include its contribution to a reduction in the ESR of a functional capacitor such as an aluminum electrolytic capacitor or tantalum capacitor, and the fact that it can also be produced with relative ease (see Japanese Patent Laid-Open No. 2006-100774).

On the other hand, in the case of a solid electrolytic capacitor in which the solid electrolyte is formed by an in-situ polymerization method, a technique has been proposed for reducing pressure increase caused by moisture during surface mounting at high temperature (see Japanese Patent Laid-Open No. 2001-148331).

In terms of conductivity improvers used for improving the conductivity of a solid electrolyte, techniques that employ sorbitol (melting point: 95° C.) and mannitol (melting point: 166° C.) have already been disclosed (see Japanese translation of PCT international application No. 2009-508341 and Japanese translation of PCT international application No. 2009-508342), but the only specific examples of a conductivity improver used with a conductive polymer have used dimethylsulfoxide. These techniques have problems in terms of changes in the properties of the capacitor during high-temperature processes within mounting steps, such as solder reflow.

SUMMARY OF INVENTION

However, when forming the solid electrolyte layer of a capacitor, if one of the conductive film formation methods disclosed in Japanese Patent Laid-Open Nos. S63-158829, S63-173313 and H07-105718 is used, then a problem arises in that the withstand voltage of the capacitor tends to fall. Moreover, in the electrolytic polymerization method disclosed in Japanese Patent Laid-Open No. S63-158829, the step of forming a conductive layer composed of a manganese oxide not only makes the method more complex, but the formed manganese oxide has low conductivity, and therefore a problem arises in that the effect of using a conductive polymer with a high degree of conductivity is weakened.

In the chemical oxidative polymerization method disclosed in Japanese Patent Laid-Open No. S63-173313, the polymerization time is long, and repeated polymerizations must be performed to ensure the required film thickness, meaning the formation efficiency for the conductive film is poor, and the conductivity achieved is also lower than that obtained using an electrolytic polymerization. If the conductivity of the capacitor is low, then a problem arises in that the ESR increases.

Similarly, in Japanese Patent Laid-Open No. 2006-100774, the capacitance tends to decrease under high-temperature conditions.

In Japanese Patent Laid-Open No. 2001-148331, a problem arises in that moisture must be removed as thoroughly as possible from the capacitor.

In Japanese translation of PCT international application Nos. 2009-508341 and 2009-508342, there were problems in terms of changes in the properties of the capacitor during high-temperature processes within mounting steps, such as solder reflow.

The present invention has been proposed in light of the circumstances described above, and has an object of providing a solid electrolytic capacitor that is able to maintain a high capacitance and low ESR, and also exhibits a high degree of heat resistance. Further, another object of the invention is to provide a method for producing a solid electrolytic capacitor that enables a capacitor having a low ESR and a high degree of heat resistance to be produced with relative ease. Moreover, yet another object of the present invention is to provide a solution for a solid electrolytic capacitor that is suitable for use within the production of a capacitor having a low ESR and a high degree of heat resistance.

In order to achieve the above objects, a first aspect of the present invention provides a solid electrolytic capacitor comprising at least an anode body composed of a porous material, a dielectric layer formed on the surface of the anode body, and a cathode body, wherein the solid electrolytic capacitor has a solid electrolyte layer formed in contact with the dielectric layer, the solid electrolyte layer comprises at least a hydroxy compound having three or more hydroxyl groups, and the hydroxy compound has a melting point of not less than 170° C.

Further, another aspect of the present invention provides a solution for a solid electrolytic capacitor that is used for forming a solid electrolyte layer of the solid electrolytic capacitor, wherein the solution for a solid electrolytic capacitor comprises at least a hydroxy compound having at three or more hydroxyl groups, and the hydroxy compound has a melting point of not less than 170° C.

Furthermore, yet another aspect of the present invention provides a method for producing a solid electrolytic capacitor comprising at least an anode body composed of a porous material, a dielectric layer formed on the surface of the anode body, and a cathode body, wherein the method comprises a step of forming, in contact with the dielectric layer, a solid electrolyte layer comprising at least a hydroxy compound that has three or more hydroxyl groups and has a melting point of not less than 170° C.

Moreover, yet another aspect of the present invention provides a solution for a solid electrolytic capacitor that comprises at least water and/or a mixed solvent containing water, a conductive complex of a cationized conductive polymer and a polymer anion, and a hydroxy compound having a melting point of not less than 170° C., wherein the degree of acidity of the solution is adjusted to a value within a range from pH 3 to pH 13.

Further, yet another aspect of the present invention provides a solid electrolytic capacitor produced by winding a porous anode foil having a dielectric layer formed thereon, and a cathode foil, with a separator having a solid electrolyte supported thereon disposed therebetween, wherein the solid electrolyte is formed by permeation of the above solution for a solid electrolytic capacitor.

Furthermore, yet another aspect of the present invention provides a method for producing a solid electrolytic capacitor by winding a porous anode foil having a dielectric layer formed thereon, and a cathode foil, with a separator having a solid electrolyte supported thereon disposed therebetween, wherein the method comprises a step of forming the solid electrolyte by permeation of the above solution for a solid electrolytic capacitor.

The solid electrolytic capacitor according to the present invention is able to maintain a high capacitance and low ESR, while providing a high degree of heat resistance. The method for producing a solid electrolytic capacitor according to the present invention enables a capacitor having a low ESR and a high degree of heat resistance to be produced with relative ease. The solution for a solid electrolytic capacitor according to the present invention can provide a low solution viscosity and a superior solution viscosity stability that are suitable for producing a capacitor having a low ESR and a high degree of heal resistance.

BRIEF DESCRIPTION OF THE DRAWINGS

FIG. 1 is a diagram illustrating an embodiment of a solid electrolytic capacitor.

DESCRIPTION OF EMBODIMENTS

[Solid Electrolytic Capacitor]

Next is a description of embodiments of the present invention, with reference to the drawing. In the following description of the drawing, it should be noted that the drawing is merely schematic, and the dimensions and proportions and the like illustrated within the drawing differ from reality, and should be assessed with due consideration of the following description.

Further, the embodiments described below provide examples of the composition and method of the present invention in order to provide specific detail of the technical concepts of the invention, but these embodiments of the present invention in no way limit the scope of the invention to the examples presented below. All manner of modifications may be made to these embodiments of the invention within the scope of the claims.

A description of an embodiment of the solution for a solid electrolytic capacitor of the present invention is presented below.

The solution for a solid electrolytic capacitor of this embodiment comprises at least water and/or a mixed solvent containing water, a conductive complex of a cationized conductive polymer and a polymer anion, and a hydroxy compound having a melting point of not less than 170° C., wherein the degree of acidity of the solution is adjusted to a value within a range from pH 3 to pH 13.

This solution for a solid electrolytic capacitor is used, within a solid electrolytic capacitor comprising an anode body composed of a porous material, a dielectric layer formed on the surface of the anode body, and a cathode body, for forming a solid electrolyte layer that contacts the dielectric layer.

[Conductive Complex]

The conductive complex describes a complex that comprises at least a cationized conductive polymer and a polymer anion, and exhibits conductivity. If required, the complex may include an anion dopant. No other particular limitations are placed on the complex. The conductive complex can be obtained easily by subjecting a precursor monomer to the conductive polymer to a chemical oxidative polymerization in the presence of an oxidant or oxidative polymerization catalyst, in the presence of a polymer anion dissolved or dispersed within a solvent.

(Conductive Polymer)

The conductive polymer can use any organic polymer in which the main chain is composed of a π-conjugated system. Examples include polypyrroles, polythiophenes, polyacetylenes, polyphenylenes, polyphenylenevinylenes, polyanilines, polyacenes, polythiophenevinylenes, and copolymers thereof. In terms of the ease of polymerization and the stability of the polymer in air, polypyrroles, polythiophenes and polyanilines are preferred.

The conductive polymer is able to provide adequate conductivity even in an unsubstituted form, but in order to further enhance the conductivity, it is preferable that functional groups such as alkyl groups, carboxyl groups, sulfo groups, alkoxyl groups, hydroxyl groups and/or cyano groups are introduced into the conductive polymer.

Specific examples of this type of conductive polymer include polypyrrole, poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3- methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polythiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxymiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxyraiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxymiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid) and poly(3-anilinesulfonic acid).

Of these, a (co)polymer composed of one or more compounds selected from among polypyrrole, polythiophene, poly(N-methylpyrrole), poly(3-methylthiophene), poly(3-methoxythiophene) and poly(3,4-ethylenedioxythiophene) can be used particularly favorably in terms of their resistance value and reactivity. Moreover, polypyrrole and poly(3,4-ethylenedioxythiophene) exhibit greater conductivity and also offer improved heat resistance, and are therefore particularly desirable.

The above conductive polymer can be produced easily by subjecting a precursor monomer that forms the conductive polymer to a chemical oxidative polymerization within a solvent, in the presence of a suitable oxidant, oxidation catalyst, and a polymer anion described below.

(Precursor Monomer)

The precursor monomer is a compound having a π-conjugated system within the molecule which, when polymerized under the action of a suitable oxidant, forms a π-conjugated system within the main chain of the polymer. Examples include pyrrole and derivatives thereof, thiophene and derivatives thereof, and aniline and derivatives thereof.

Specific examples of the precursor monomer include pyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxypyrrole, 3-methyl-4-carboxypyrrole, 3-methyl-4-carboxyethylpyrroles 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 314-ethylenedioxythiophene, 3,4-propylenedioxythiophene, 3,4-butenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, aniline, 2-methylaniline, 3-isobutylaniline, 2-anilinesulfonic acid and 3-anilinesulfonic acid.

(Polymer Anion)

The polymer anion refers to a polymer having anion groups on the side chains of the polymer.

These anion groups may be any functional group capable of causing chemical oxidative doping of the conductive polymer, and of the various possibilities, from the viewpoints of ease of production and stability, monosubstituted sulfate ester groups, monosubstituted phosphate ester groups, phosphoric acid groups, carboxyl groups, and sulfo groups and the like are preferred. Moreover, in terms of the doping effect of the functional group on the conductive polymer, sulfo groups, monosubstituted sulfate ester groups and carboxyl groups are particularly desirable.

The polymer is a substituted or unsubstituted polyalkylene, substituted or unsubstituted polyalkenylene, substituted or unsubstituted polyimide, substituted or unsubstituted polyamide, substituted or unsubstituted polyester, or a copolymer thereof, and is either composed of structural units having an anion group, or composed of structural units having an anion group and structural units having no anion group.

The anion groups of this polymer anion function as a dopant for the conductive polymer, improving the conductivity and heat resistance of the conductive polymer.

Specific examples of the polymer anion include polyvinylsulfonic acid, polystyrenesulfonic acid, polyallylsulfonic acid, polyacrylsulfonic acid, polymethacrylsulfonic acid, poly-2-acrylamido-2-methylpropanesulfonic acid, polyisoprenesulfonic acid, polyvinylcarboxylic acid, polystyrenecarboxylic acid, polyallylcarboxylic acid, polyacrylcarboxylic acid, polymethacrylcarboxylic acid, poly-2-acrylamido-2-methylpropanecarboxylic acid, polyisoprenecarboxylic acid and polyacrylic acid. The polymer anion may be either a homopolymer of one of the above polymers, or a copolymer of two or more polymers.

Of the above examples, polystyrenesulfonic acid, polyacrylsulfonic acid and polymethacrylsulfonic acid are preferred. Because polyacrylsulfonic acid and polymethacrylsulfonic acid absorb thermal energy and undergo self-decomposition, thermal decomposition of the conductive polymer is alleviated, resulting in superior heat resistance and environmental resistance.

The polymerization degree of the polymer anion is preferably within a range from 10 to 100,000 monomer units, and from the viewpoints of solvent solubility and conductivity, is more preferably within a range from 50 to 10,000 monomer units.

Examples of methods for producing the polymer anion include methods in which an acid is used to introduce anion groups directly into a polymer having no anion groups, methods in which a polymer having no anion groups is sulfonated using a sulfonating agent, and methods in which an anion group-containing polymerizable monomer is polymerized.

Examples of the methods for producing the polymer anion by polymerizing an anion group-containing polymerizable monomer include methods in which an anion group-containing polymerizable monomer is subjected to either oxidative polymerization or radical polymerization within a solvent, in the presence of an oxidant and/or a polymerization catalyst. In a specific example, a predetermined amount of the anion group-containing polymerizable monomer is dissolved in a solvent, and with the solution held at a constant temperature, a solution prepared in advance by dissolving a predetermined amount of an oxidant and/or a polymerization catalyst in a solvent is added to the monomer solution, and reaction is allowed to proceed for a predetermined time. The polymer obtained in this reaction is adjusted to a specific concentration using a solvent, in this production method, a polymerizable monomer having no anion group may be copolymerized with the anion group-containing polymerizable monomer.

The oxidant, oxidation catalyst and solvent used during polymerization of the anion group-containing polymerizable monomer are similar to those used during polymerization of the precursor monomer that forms the conductive polymer. In those cases where the resulting polymer is a polymer anion salt, this salt is preferably converted to a polymer anion acid. Examples of the method used for this conversion to an anion acid include ion exchange methods using an ion exchange resin and ultrafiltration methods. Of these, ultrafiltration methods are preferred in terms of ease of operation.

The anion group-containing polymerizable monomer is a compound in which a portion of the monomer has been substituted with a monosubstituted sulfate ester group, a carboxyl group or a sulfo group or the like. Examples include substituted or unsubstituted ethylenesulfonic acid compounds, substituted or unsubstituted styrenesulfonic acid compounds, substituted or unsubstituted acrylate sulfonic acid compounds, substituted or unsubstituted methacrylate sulfonic acid compounds, substituted or unsubstituted acrylamide sulfonic acid compounds, substituted or unsubstituted cyclovinylenesulfonic acid compounds, substituted or unsubstituted butadienesulfonic acid compounds, and substituted or unsubstituted vinyl aromatic sulfonic acid compounds.

Specific examples include vinylsulfonic acid and salts thereof, allylsulfonic acid and salts thereof, methallylsulfonic acid and salts thereof, styrenesulfonic acid and salts thereof, methallyloxybenzenesulfonic acid and salts thereof, allyloxybenzenesulfonic acid and salts thereof, α-methylstyrenesulfonic acid and salts thereof, acrylamido-t-butylsulfonic acid and salts thereof, 2-acrylamido-2-methylpropanesulfonic acid and salts thereof, cyclobutene-3-sulfonic acid and salts thereof, isoprenesulfonic acid and salts thereof, 1,3-butadiene-1-sulfonic acid and salts thereof, 1-methyl-1,3-butadiene-2-sulfonic acid and salts thereof, 1-methyl-1,3-butadiene-4-sulfonic acid and salts thereof, ethyl acrylate sulfonic acid ($CH_2CH-COO-(CH_2)_2-SO_3H$) and salts thereof, propyl acrylate sulfonic acid ($CH_2CH-COO-(CH_2)_3-SO_3H$) and salts thereof, t-butyl acrylate sulfonic acid ($CH_2CH-COO-C(CH_3)_2-SO_3H$) and salts thereof, n-butyl acrylate sulfonic acid ($CH_2CH-COO-(CH_2)_4-SO_3H$) and salts thereof, ethyl allylate sulfonic acid ($CH_2CHCH_2-COO-(CH_2)_2-SO_3H$) and salts thereof, t-butyl allylate sulfonic acid ($CH_2CHCH_2-COO-C(CH_3)_2CH_2-SO_3H$) and salts thereof, ethyl 4-pentenoate sulfonic acid ($CH_2CH(CH_2)_2-COO-(CH_2)_2-SO_3H$) and salts thereof, propyl 4-pentenoate sulfonic acid ($CH_2CH(CH_2)_2-COO-(CH_2)_3-SO_3H$) and salts thereof, n-butyl 4-pentenoate sulfonic acid ($CH_2CH(CH_2)_2-COO-(CH_2)_4-SO_3H$) and salts thereof, t-butyl 4-pentenoate sulfonic acid ($CH_2CH(CH_2)_2-COO-C(CH_3)_2-CH_2-SO_3H$) and salts thereof, phenylene 4-pentenoate sulfonic acid ($CH_2CH(CH_2)_2-COO-C_6H_4-SO_3H$) and salts thereof, naphthalene 4-pentenoate sulfonic acid ($CH_2CH(CH_2)_2-COO-C_{10}H_8SO_3H$) and salts thereof, ethyl methacrylate sulfonic acid ($CH_2C(CH_3)-COO-(CH_2)_2-SO_3H$) and salts thereof, propyl methacrylate sulfonic acid ($CH_2C(CH_3)-COO-(CH_2)_3-SO_3H$) and salts thereof, t-butyl methacrylate sulfonic acid ($CH_2C(CH_3)-COO-C(CH_3)_2CH_2-SO_3H$) and salts thereof, n-butyl methacrylate sulfonic acid ($CH_2C(CH_3)COO-(CH_2)_4-SO_3H$) and salts thereof, phenylene methacrylate sulfonic acid ($CH_2C(CH_3)-COO-C_6H_4-SO_3H$) and salts thereof, naphthalene methacrylate sulfonic acid ($CH_2C(CH_3)-COO-C_{10}H_8-SO_3H$) and salts thereof, polyvinylcarboxylic acid, polystyrenecarboxylic acid, polyallylcarboxylic acid, polyacrylcarboxylic acid, polymethacrylcarboxylic acid, poly-2-acrylamido-2-methylpropanecarboxyic acid, polyisoprenecarboxylic acid and polyacrylic acid. The polymer anion may also be a copolymer of two or more of the above compounds.

Examples of polymerizable monomers having no anion group include ethylene, propene, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinyl acetate, acrylaldehyde, acrylonitrile, N-vinyl-2-pyrrolidone, N-vinylacetamide, N-vinylformamide, N-vinylimidazole, acrylamide, N,N-dimethylacrylamide, acrylic acid, methyl acrylate, ethyl acrylate, propyl acrylate, n-butyl acrylate, iso-butyl acrylate, t-butyl acrylate, iso-octyl acrylate, iso-nonylbutyl acrylate, lauryl acrylate, allyl acrylate, stearyl acrylate, isobornyl acrylate, cyclohexyl acrylate, benzyl acrylate, ethylcarbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, i-butyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylamylamine, N,N-diethylvinylamine, N,N-dibutylvinylamine, N,N-di-t-butylvinylamine, N,N-diphenylvmylamine, N-vinylcarbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene and 2-hydroxy-1,3-butadiene.

By conducting a copolymerization with these polymerizable monomers having no anion group, the solvent solubility of the polymer anion can be controlled.

There are no particular limitations on the amount of the polymer anion within the conductive complex, provided that the conductive polymer can be dissolved or dispersed stably within a solvent. In a preferred complex, the number of mols of anion groups within the polymer anion is 1- to 5-fold the number of mols of the conductive polymer. Provided the amount of the polymer anion satisfies this range, the conductive complex is able to achieve both a high degree of conductivity and stable dispersibility. If the above number is less than 1-fold, then the dispersibility tends to deteriorate, whereas if the amount exceeds 5-fold, then the conductivity tends to decrease.

(Polymer Anion Salt)

A water dispersion or solution of the conductive complex comprising the polymer anion and conductive polymer typically has a pH that is lower than 3, and therefore is strongly acidic and exhibits minimal permeation into the capacitor elements. In order to improve the permeation of the conductive complex into the interiors of the anode foil and cathode foil, the degree of acidity is preferably adjusted. The solution for the capacitor of the present embodiment is preferably within a range from pH 3 to 13. The pH is more preferably within a range from 4 to 8.

The pH of the aqueous solution or dispersion of the conductive complex of the aforementioned polymer anion and conductive polymer may be adjusted by adding an alkaline compound to the solution or dispersion. By adjusting the pH, the degree of acidity of the conductive complex can be altered easily, and a salt of the polymer anion is formed.

Adjustment of the degree of acidity can be performed using a pH modifier, examples of which include alkalis, amines, imidazoles and pyridines.

Examples of the alkalis include sodium hydroxide, potassium hydroxide, calcium hydroxide and ammonia. Further, examples of the amines include aliphatic amines such as ethylamine, diethylamine, methylethylamine and triethylamine, aromatic amines such as aniline, benzylamine, pyrrole, imidazole and pyridine, and derivatives thereof.

Of these, weakly basic aliphatic amines, imidazoles, pyridines and metal alkoxides are preferred.

By using, as the aliphatic amine, a primary amine (such as methylamine, ethylamine, propylamine, butylamine, ethylenediamine, aminoethanol, aminopropanediol or 3-amino-1-propanol), a secondary amine (such as dimethylamine, diethylamine, dipropylamine, methylethylamine, diphenylamine, iminodiethanol or ethylaminopropanol), a tertiary amine (such as trimethylamine, triethylamine, tripropylamine, triphenylamine, 1,8-diazabicyclo(5,4,0)-undecene-7 or nitrilotriethanol), or a tetraalkylammonium (such as tetramethylammonium, tetraethylammonium, tetrapropylammonium, tetrabutylammonium, methyltriethylammonium or dimethyldiethylammonium), an ammonium salt of the polymer anion can be formed.

Specific examples of the imidazoles and derivatives thereof include imidazole, 2-methylimidazole, 2-propylimidazole, 2-undecylimidazole, 2-phenylimidazole, N-methylimidazole, 1*(2-hydroxyethyl)imidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-4-methylbenzimidazole, 2-hydroxybenzimidazole and 2-(2-pyridyl)benzimidazole.

Specific examples of the pyrimidines and derivatives thereof include 2-amino-4-chloro-6-methylpyrimidine, 2-amino-6-chloro-4-methoxypyrimidine 2-ammo-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine and 2,4-pyrimidinediol (Solvent)

There are no particular limitations on the solvent used during production of the conductive polymer, and any solvent capable of dissolving or dispersing the above precursor monomer and maintaining the oxidative power of the oxidant and oxidation catalyst may be used. Examples of the solvent include polar solvents such as water, N-methyl-2-pyrrolidone, N,N-dimethylformamide, N,N-dimethylacetamide, dimethylsulfoxide, hexamethylene phosphortriamide, acetonitrile and benzonitrile, phenols such as cresol, phenol and xylenol, alcohols such as methanol, ethanol, propanol and butanol, ketones such as acetone and methyl ethyl ketone, hydrocarbons such as hexane, benzene and toluene, carboxylic acids such as formic acid and acetic acid, carbonate compounds such as ethylene carbonate and propylene carbonate, ether compounds such as dioxane and diethyl ether, chain-like ethers such as ethylene glycol dialkyl ethers, propylene glycol dialkyl ethers, polyethylene glycol dialkyl ethers and polypropylene glycol dialkyl ethers, heterocyclic compounds such as 3-methyl-2-oxazolidinone, and nitrile compounds such as acetonitrile, glutarodinitrile, methoxyacetonitrile, propionitrile and benzonitrile. These solvents may be used individually, as mixtures containing two or more of the above solvents, or as mixtures with other organic solvents.

(Oxidant and Oxidation Catalyst)

Any oxidant and/or oxidation catalyst that is capable of oxidizing the aforementioned precursor monomer to obtain the conductive polymer may be used, and examples include peroxodisulfates such as ammonium peroxodisulfate, sodium peroxodisulfate and potassium peroxodisulfate, transition metal compounds such as ferric chloride, ferric sulfate, ferric nitrate and cupric chloride, metal halide compounds such as boron trifluoride and aluminum chloride, metal oxides such as silver oxide and cesium oxide, peroxides such as hydrogen peroxide and ozone, organic peroxides such as benzoyl peroxide, and oxygen and the like.

[Hydroxy Compound]

The hydroxy compound of the present embodiment is an aliphatic compound having a melting point of not less than 170° C. and comprising three or more hydroxyl groups within each molecule. Examples include sugars, sugar alcohols and polyhydroxy compounds.

Specific examples include sugars and sugar derivatives such as sucrose, maltose, xylose and cellulose, sugar alcohols such as D-glucitol, mannite, pentaerythritol and dipentaerythritol, as well as polyvinyl alcohol. In terms of the thermal stability of the conductive polymer film, a compound having a high melting point is preferred. A compound having a melting point of at least 170° C. is preferred. Examples of such compounds include pentaerythritol and dipentaerythritol.

The amount of the hydroxy compound may be any amount that yields a mass ratio relative to the conductive complex of not less than 0.5-fold. The amount of the hydroxy compound is preferably greater than the mass of the conductive complex, and an amount within a range from 1- to 20-fold the mass of the conductive complex is particularly desirable. If the amount of the hydroxy compound satisfies this range, then the solid electrolyte is able to exhibit favorable levels of both heat resistance and conductivity. If the amount exceeds 20-fold, then the film formability of the solid electrolyte tends to deteriorate.

(Solvent)

In terms of the solvent for the solution for a solid electrolytic capacitor according to the present invention, water and solvents that can be mixed with water can be used favorably. Examples of the solvent include polar solvents such as water, N-methyl-2-pyrrolidone, N,N-dimethylformamide, N,N-dimethylacetamides dimethylsulfoxide, hexamethylene phosphortriamide, acetonitrile and benzonitrile, phenols such as cresol, phenol and xylenol, alcohols such as methanol, ethanol, propanol and butanol, ketones such as acetone and methyl ethyl ketone, hydrocarbons such as hexane, benzene and toluene, carboxylic acids such as formic acid and acetic acid, carbonate compounds such as ethylene carbonate and propylene carbonate, ether compounds such as dioxane and diethyl ether, chain-like ethers such as ethylene glycol dialkyl ethers, propylene glycol dialkyl ethers, polyethylene glycol dialkyl ethers and polypropylene glycol dialkyl ethers, heterocyclic compounds such as 3-methyl-2-oxazolidinone, and nitrile compounds such as acetonitrile, glutarodinitrile, methoxyacetonitrile, propionitrile and benzonitrile.

(Particle Size)

In terms of achieving favorable permeation of the conductive complex of the present embodiment into the interior of the capacitor elements, the average particle size of the conductive complex is preferably not more than 1,500 nanometers, and more preferably 500 nanometers or less. If the average particle size exceeds 1,500 nanometers, then the complex tends to include large numbers of particles that are larger than the pores within the porous aluminum foil, meaning permeation of the particles into the interior of the foil worsens, and achieving the desired properties of capacitance and the like becomes difficult. Further, d50 is preferably 1,000 nanometers or less, and more preferably 100 nanometers or less.

The particle size can be controlled by adjusting the polymerization degree of the conductive polymer and the molecular weight of the polymer anion during synthesis of the conductive complex. Further, the particle size can also be controlled by altering the dispersion method employed following synthesis of the conductive complex, or by adding a dispersant Examples of the dispersion method include high-pressure grinding and the like.

(Solution Viscosity)

The capacitor solution according to the present embodiment is preferably formed with a solid fraction concentration for the conductive complex of 0.5 to 3.0% by mass, and more preferably 1.0 to 2.0% by mass. Provided this solid fraction concentration is at least 0.5% by mass, a solid electrolyte film can be formed with ease, and provided the concentration is not more than 3.0% by mass, the viscosity can be reduced, enabling the capacitor solution to readily permeate into the interior of the porous capacitor substrate.

In order to achieve improved permeation properties, the viscosity of the solution is preferably not more than 100 mPa·s, more preferably not more than 50 mPa·s, and most preferably 30 mPa·s or lower.

Examples of methods for lowering the viscosity of the capacitor solution include methods that involve lowering the solid fraction concentration of the capacitor solution, methods that employ an adjustment of the molecular weight of the polymer anion, methods that involve adding a low-viscosity solvent component, and methods that involve enhancing the dispersibility of the π-conjugated conductive polymer. Any one of these methods may be used alone, or combinations of two or more methods may be employed.

In methods that employ an adjustment of the molecular weight of the polymer anion, the mass average molecular weight of the polymer anion is preferably adjusted to a value within a range from 100,000 to 1,000,000, and more preferably from 200,000 to 800,000. Provided the mass average molecular weight of the polymer anion is not less than 100,000 and not more than 1,000,000, the viscosity of the capacitor solution can be reduced, enabling the conductive polymer solution to readily permeate into the interior of the porous capacitor substrate.

Examples of the low-viscosity solvent component used in methods that involve adding a low-viscosity solvent component include alcohol-based solvents such as methanol, and ether-based solvents such as diethyl ether.

Examples of methods that involve enhancing the dispersibility of the capacitor solution include high-pressure dispersion methods, ultrasonic dispersion methods and high-speed fluid dispersion methods.

(Conductivity Improver)

In order to further enhance the conductivity of the solid electrolyte within the solid electrolytic capacitor of the present embodiment, a compound that can raise the conductivity of the conductive polymer may be added. Here, the term "conductivity improver" describes a compound that interacts with either the conductive polymer or the conductive polymer dopant, thereby improving the electrical conductance of the conductive polymer.

This compound is preferably one or more compounds selected from the group consisting of ether compounds, nitrogen-containing aromatic cyclic compounds, compounds containing two or more hydroxyl groups, compounds containing two or more carboxyl groups, compounds containing one or more hydroxyl groups and one or more carboxyl groups, compounds containing an amide group, compounds containing an imide group, lactam compounds, compounds containing a glycidyl group and acrylic compounds and the like, —Nitrogen-Containing Aromatic Cyclic Compounds Examples of the nitrogen-containing aromatic cyclic compounds include pyridines and derivatives thereof, which contain a single nitrogen atom, imidazoles and derivatives thereof, pyrimidines and derivatives thereof, and pyrazines and derivatives thereof, all of which contain two nitrogen atoms, and triazines and derivatives thereof, which contain three nitrogen atoms. From the viewpoint of the solubility within solvents, pyridines and derivatives thereof, imidazoles and derivatives thereof, and pyrimidines and derivatives thereof are preferred.

Further, in the nitrogen-containing aromatic cyclic compound, a substituent such as an alkyl group, hydroxyl group, carboxyl group, cyano group, phenyl group, phenol group, ester group, alkoxyl group or carbonyl group may or may not be introduced into the ring. Furthermore, the ring may also be a polycyclic structure.

Specific examples of the pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexenopyridine, 1,2-di(4-pyridyl)ethane, 1,2-di(4-pyridyl)propane, 2-pyridinecarboxaldehyde, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid and 3-pyridinesulfonic acid.

Specific examples of the imidazoles and derivatives thereof include imidazole, 2-methylimidazole, 2-propylimidazole, 2-undecylimidazole, 2-phenylimidazole, N-methylimidazole, N-vinylimidazole, N-alkylimidazole, 1-(2-hydroxyethyl)imidazoles 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazoles, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole and 2-(2-pyridyl)benzimidazole.

Specific examples of the pyrimidines and derivatives thereof include 2-amino-4-chloro-6-methylpyrimidines, 2-ammo-6-chloro-4-methoxypyrimidine, 2-amino-4,6-dichloropyrimidine, 2-amino-4,6-dihydroxypyrimidine, 2-amino-6-dimethylpyrimidine-2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine and 2,4-pyrimidinediol.

Specific examples of the pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine and 2,3-dimethylpyrazine.

Specific examples of the triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridyl-1,3,5-triazine, 3-(2-pyridyl)-5,6-bis(4-phenylsulfonic acid)-1,2,4-triazine disodium, 3-(2-pyridyl)-5,6-diphenyl-1,2,4-triazine, 3-(2-pyridyl)-5,6-diphenyl-1,2,4-triazine-ρ,ρ'-disulfonic acid disodium, and 2-hydroxy-4,6-dichloro-1,3,5-triazine.

Examples of the substituent that may be introduced at the nitrogen atom of the nitrogen-containing aromatic cyclic compound include a hydrogen atom, or an alkyl group, hydroxyl group, carboxyl group, cyano group, phenyl group, phenol group, ester group, alkoxyl group, or carbonyl group. In terms of the type of substituent, any of the substituents listed above may be introduced.

The amount of the nitrogen-containing aromatic cyclic compound is preferably within a range from 0.1 to 100 mols, and more preferably from 0.5 to 30 mols, per 1 mol of anion group units within the polymer anion. From the viewpoint of the conductivity of the conductive complex, this amount is most preferably within a range from 1 to 10 mols. If the amount of the nitrogen-containing aromatic cyclic compound is less than 0.1 mols, then the conductivity may be inadequate. In contrast, if the amount of the nitrogen-containing aromatic cyclic compound exceeds 100 mols, then the amount of the conjugated conductive polymer is reduced, which makes it difficult to achieve a satisfactory degree of conductivity.

—Compounds Containing Two or More Hydroxyl Groups

Examples of the compounds containing two or more hydroxyl groups include polyhydric aliphatic alcohols such as propylene glycol, 1,3-butylene glycol, 1,4-butylene glycol, glycerol, digylcerol, isoprene glycol, dimethylolpropionic acid, butanediol, 1,5-pentanediol, 1,6-hexanediol, 1,9-nonanediol, neopentyl glycol, trimethylolethane, trimethylolpropane, thiodiethanol, tartaric acid, D-glucaric acid and glutaconic acid; and aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, phenyl 1,4-dihydroxy-2-naphthoate, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate, ethyl gallate and potassium hydroquinone sulfonate.

The amount of the compound containing two or more hydroxyl groups is preferably within a range from 0.05 to 50 mols, and more preferably from 0.3 to 10 mols, per 1 mol of anion group units within the polymer anion. If the amount of the compound containing two or more hydroxyl groups is less than 0.05 mols per 1 mol of anion group units within the polymer anion, then the resulting conductivity and heat resistance may be inadequate. In contrast, if the amount of the compound containing two or more hydroxyl groups exceeds 50 mols per 1 mol of anion group units within the polymer anion, then the amount of the conductive polymer within the solid electrolyte layer 13a is reduced, which makes it difficult to achieve a satisfactory degree of conductivity, and may alter the physical properties of the solid electrolyte layer 13a.

—Compounds Containing Two or More Carboxyl Groups

Examples of the compounds containing two or more carboxyl groups include aliphatic carboxylic acid compounds such as maleic acid, fumaric acid, itaconic acid, citraconic acid, malonic acid, 1,4-butanedicarboxylic acid, succinic acid, tartaric acid, adipic acid, D-glucaric acid, glutaconic acid and citric acid; aromatic carboxylic acid compounds containing at least one carboxyl group bonded to an aromatic ring, such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydride, benzophenonetetracarboxylic dianhydride, naphthalenedicarboxylic acid, trimellitic acid, and pyromellitic acid; as well as diglycolic acid, oxydibutyric acid, thiodiacetic acid, thiodibutylic acid, iminodiacetic acid and iminobutyric acid.

The amount of the compound containing two or more carboxyl groups is preferably within a range from 0.1 to 30 mols, and more preferably from 0.3 to 10 mols, per 1 mol of anion group units within the polymer anion. If the amount of the compound containing two or more carboxyl groups is less than 0.1 mols per 1 mol of anion group units within the polymer anion, then the resulting conductivity and heat resistance may be inadequate. In contrast, if the amount of the compound containing two or more carboxyl groups exceeds 30 mols per 1 mol of anion group units within the polymer anion, then the amount of the conductive polymer within the solid electrolyte layer 13a is reduced, which makes it difficult to achieve a satisfactory degree of conductivity, and may alter the physical properties of the solid electrolyte layer 13.

—Compounds Containing One or More Hydroxyl Groups and One or More Carboxyl Groups Examples of the compounds containing one or more hydroxyl groups and one or more carboxyl groups include tartaric acid, glyceric acid, dimethylolbutanoic acid, dimethylolpropanoic acid, D-glucaric acid and glutaconic acid.

The amount of the compound containing one or more hydroxyl groups and one or more carboxyl groups is preferably within a range from 1 to 5,000 parts by mass, and more preferably from 50 to 500 parts by mass, per 100 parts by mass of the conductive complex. If the amount of the compound containing one or more hydroxyl groups and one or more carboxyl groups is less than 1 part by mass, then the resulting conductivity and heat resistance may be inadequate. In contrast, if the amount of the compound containing one or more hydroxyl groups and one or more carboxyl groups exceeds 5,000 parts by mass, then the amount of the conductive polymer within the solid electrolyte is reduced, making it difficult to achieve a satisfactory degree of conductivity.

—Compounds Containing an Amide Group

The compounds containing an imide group are monomolecular compounds having an amide linkage represented by —CO—NH— (wherein the CO portion incorporates a double bond) within the molecule. In other words, examples of the amide compound include compounds that contain functional groups at both terminals of the above linkage, compounds in which a cyclic compound is bonded to one of the terminals of the above linkage, urea, in which the functional groups at both of the above terminals are hydrogen atoms, and urea derivatives.

Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butyramide, isobutyramide, methacrylamide, palmitamide, stearamide, oleamide, oxamide, glutaramide, adipamide, cinnamamide, gluconamide, lactamide, glyceramide, tartaramide, citramide, glyoxylamide, pyruvamide, acetoacetamide, dimethylacetamide, benzylamide, anthranilamide, ethylenediaminetetraacetamide, diacetamide, triacetamide, dibenzamide, tribenzamide, rhodanine, urea, 1-acetyl-2-thiourea, biuret butylurea, dibutylurea, 1,3-dimethylurea, 1,3-diethylurea, and derivatives thereof.

The molecular weight of the amide compound is preferably within a range from 46 to 10,000, more preferably from 46 to 5,000, and most preferably from 46 to 1,000.

The amount of the amide compound is preferably within a range from 1 to 5,000 parts by mass, and more preferably from 50 to 500 parts by mass, per 100 parts by mass of the combination of the conductive complex. If the amount of the amide compound is less than 1 part by mass, then the resulting conductivity and heat resistance may be inadequate. In contrast, if the amount of the amide compound exceeds 5,000 parts by mass, then the amount of the conductive polymer within the solid electrolyte is reduced, making it difficult to achieve a satisfactory degree of conductivity.

—Imide Compounds

The imide compounds are preferably monomolecular compounds containing an imide linkage (hereafter referred to as an imide compound), as such compounds yield a greater improvement in the conductivity. Examples of the imide compounds, described in terms of the molecular skeleton, include phthalimide and phthalimide derivatives, succinimide and succinimide derivatives, benzimide and benzimide derivatives, maleimide and maleimide derivatives, and naphthalimide and naphthalimide derivatives.

Further, the imide compounds are classified as either aliphatic imides or aromatic imides or the like on the basis of the types of functional groups at the two terminals, and from the viewpoint of solubility, aliphatic imides are preferred.

Moreover, aliphatic imide compounds can be classified into saturated aliphatic imide compounds, which contain no unsaturated bonds between the carbon atoms within the molecule, and unsaturated aliphatic imide compounds, which contain one or more unsaturated bonds between the carbon atoms within the molecule.

Saturated aliphatic imide compounds are compounds represented by the formula: $R^1$—CO—NH—CO—$R^2$, wherein $R^1$ and $R^2$ are both saturated hydrocarbon groups. Specific examples include cyclohexane-1,2-dicarboximide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboximide, semicarbazide, α,α-dimethyl-6-methylsuccinimide, bis[2-(succinimidooxycarbonyloxy)ethyl]sulfone, α-methyl-α-propylsuccinimide and cyclohexylamide.

Unsaturated aliphatic imide compounds are compounds represented by the formula; $R^1$—CO—NH—CO—$R^2$, wherein either one or both of $R^1$ and $R^2$ contain one or more unsaturated bonds. Specific examples include 1,3-dipropyleneurea, maleimide, N-methylmaleimide, N-ethylmaleimide, N-hydroxymaleimide, 1,4-bismaleimidobutane, 1,6-bismaleimidohexane, 1,8-bismaietmidooctane and N-carboxheptylmaleimide.

The molecular weight of the imide compound is preferably within a range from 60 to 5,000, more preferably from 70 to 1,000, and most preferably from 80 to 500.

The amount of the imide compound is preferably within a range from 10 to 10,000 parts by mass, and more preferably from 50 to 5,000 parts by mass, per 100 parts by mass of the conductive complex. If the amount of the imide compound is less than the lower limit of the above range, then the effects achieved by adding the imide compound tend to diminish, which is undesirable. In contrast, if the amount exceeds the upper limit of the above range, then the conductivity tends to decrease as a result of a reduction in the concentration of the conductive polymer, which is also undesirable.

—Lactam Compounds

A lactam compound is an intramolecular cyclic amide of an aminocarboxylic acid, and is a compound in which a portion of the ring can be represented by —CO—NR— (wherein R is a hydrogen atom or an arbitrary substituent). One or more of the carbon atoms within the ring may be unsaturated or substituted with a hetero atom.

Examples of the lactam compounds include pentano-4-lactam, 4-pentanelactam, 5-methyl-2-pyrrolidone, 5-methyl-2-pyrrolidinone, hexano-6-lactam, and 6-hexanelactam.

—Compounds Containing a Glycidyl Group

Examples of the compounds containing a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A diglycidyl ether, glycidyl ether acrylate and glycidyl ether methacrylate.

—Organic Solvents

Furthermore, if a portion of an organic solvent remains within the solid electrolyte, then this solvent also functions as a conductivity improver. Examples of the organic solvents that can act as conductivity improvers include polar solvents such as N-methyl-2-pyrrolidone, N,N-dimethylformamide, N,N-dimethylacetamide, dimethylsulfoxide, hexamethylenephosphortriamide, N-vinylpyrrolidone, N-vinylformamide and N-vinylacetamide, phenols such as cresol, phenol and xylenol, polyhydric aliphatic alcohols such as ethylene glycol, diethylene glycol, triethylene glycol, propylene glycol, dipropylene glycol, 1,3-butylene glycol, 1,4-butylene glycol, glycerol, digylcerol, isoprene glycol, butanediol, 1,5-pentanediol, 1,6-hexanediol, 1,9-nonanediol and neopentyl glycol, carbonate compounds such as ethylene carbonate and propylene carbonate, ether compounds such as dioxane and diethyl ether, chain-like ethers such as dialkyl ethers, propylene glycol dialkyl ethers, polyethylene glycol dialkyl ethers and polypropylene glycol dialkyl ethers, heterocyclic compounds such as 3-methyl-2-oxazolidinone, and nitrile compounds such as acetonitrile, glutarodinitrile, methoxyacetonitrile, propionitrile and benzonitrile. These solvents may be used either individually, or as mixtures containing two or more different solvents.

[Ether Compounds]

Any compound having an ether group may be used favorably as the ether compound.

Specific examples include diethylene glycol, triethylene glycol, oligopolyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, polyether, glycidyl ethers, polyethylene glycol glycidyl ethers, polyethylene oxide, triethylene glycol monobutyl ether, triethylene glycol monoethyl ether, triethylene glycol monomethyl ether, tetraethylene glycol monobutyl ether, triethylene glycol dimethyl ether, tetraethylene glycol dimethyl ether, diethylene glycol dimethyl ether, diethylene glycol diethyl ether, diethylene glycol dibutyl ether, dipropylene glycol, tripropylene glycol, polypropylene glycol, polypropylene dioxide, polyoxyethylene alkyl ethers, polyoxyethylene glycerol fatty acid esters and polyoxyethylene fatty acid amides.

The amount of the ether compound is preferably within a range from 1 to 10,000 parts by mass, and more preferably from 50 to 1,500 parts by mass, per 100 parts by mass of the conductive complex of the conductive polymer and the polymer anion. If the amount of the ether compound is less than 1 part by mass, then the conductivity of the conductive complex may not improve, whereas if the amount exceeds 10,000 parts by mass, then the stability of the capacitor solution tends to worsen.

(Monomer Anion)

In the conductive complex of the present embodiment, the conductivity may sometimes be improved by incorporating a monomer anion. This monomer anion may be introduced as required. There are no particular limitations on the method used for introducing the monomer anion, and for example, the monomer anion may be added during synthesis of the conductive complex from the precursor monomer to the conductive polymer and the polymer anion, or alternatively, the conductive complex may first be synthesized from the precursor monomer to the conductive polymer and the polymer anion, and the monomer anion then added to the dispersion or solution of the conductive complex. Examples of the monomer anion include organic carboxylic acids, organic sulfonic acids and inorganic acids.

Examples of organic carboxylic acids that may be used include aliphatic, aromatic, and cyclic aliphatic carboxylic acids having one or more carboxyl groups. Specific examples include formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid and triphenylacetic acid.

Examples of organic sulfonic acids that may be used include aliphatic, aromatic, and cyclic aliphatic sulfonic acids having one or more sulfo groups, or polymers containing sulfo groups.

Specific examples of organic sulfonic acids containing one sulfo group include methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, 1-tetradecanesulfonic acid, 1-pentadecanesulfonic acid, 2-bromoethanesulfonic acid, 3-chloro-2-hydroxypropanesulfonic acid, trifluoromethanesulfonic acid, trifluoromethanesulfonic acid, colistinmethanesulfonic acid, 2-acrylamido-2-methylpropanesulfonic acid, aminomethanesulfonic acid, 1-amino-2-naphthol-4-sulfonic acid, 2-amino-5-naphthol-7-sulfonic acid, 3-aminopropanesulfonic acid, N-cyclohexyl-3-aminopropanesulfonic acid, benzenesulfonic acid, alkylbenzenesulfonic acids, p-toluenesulfonic acid, xylenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, hexadecylbenzenesulfonic acid, 2,4-dimethylbenzenesulfonic acid, dipropylbenzenesulfonic acid, 4-aminoberizenesulfonic acid, o-aminobenzenesulfonic acid, m-aminobenzenesulfonic acid, 4-amino-2-chlorotoluene-5-sulfonic acid, 4-amino-3-methylbenzene-4-sulfonic acid, 4-amino-5-methoxy-2-methylbenzenesulfonic acid, 2-amino-5-methylbenzene-1-sulfonic acid, 4-amino-2-methylbenzene-1-sulfonic acid, 5-amino-2-methylbenzene-1-sulfonic acid, 4-amino-3-methylbenzene-1-sulfonic acid, 4-acetamido-3-chlorobenzenesulfonic acid, 4-chloro-3-nitrobenzenesulfonic acid, p-chlorobenzenesulfonic acid, naphthalenesulfonic acid, methylnaphthalenesulfonic acid, propylnaphthalenesulfonic acid, butylnaphthalenesulfonic acid, pentylnaphthalenesulfonic acid, 4-amino-1-naphthalenesulfonic acid, 8-chloronaphthalene-1-sulfonic acid, naphthalenesulfonic acid-formalin condensate, melaminesulfonic acid formalin condensate, anthraquinonesulfonic acid and pyrenesulfonic acid. Further, metal salts of these acids may also be used.

Specific examples of organic sulfonic acids containing two or more sulfo groups include ethanedisulfonic acid, butanedisulfonic acid, pentanedisulfonic acid, decanedisulfonic acid, o-benzenedisulfonic acid, m-benzenedisulfonic acid, p-benzenedisulfonic acid, toluenedisulfonic acid, xylenedisulfonic acid, chlorobenzenedisulfonic acid, fluorobenzenedisulfonic acid, dimethylbenzenedisulfonic acid, diethylbenzenedisulfonic acid, aniline-2,4-disulfonic acid, aniline-2,5-disulfonic acid, 3,4-dihydroxy-1,3-benzenedisulfonic acid, naphthalenedisulfonic acid, methylnaphthalenedisulfonic acid, ethylnaphthalenedisulfonic acid, pentadecylnaphthalenedisulfonic acid, 3-amino-5-hydroxy-2,7-naphthalenedisulfonic acid, 1-acetamido-8-hydroxy-3,6-naphthalenedisulfonic acid, 2-amino-1,4-benzenedisulfonic acid, 1-amino-3,8-naphthalenedisulfonic acid, 3-amino-1,5-naphthalenedisulfonic acid, 8-amino-1-naphthol-3,6-disulfonic acid, 4-amino-5-naphthol-2,7-disulfonic acid, 4-acetamido-4'-isothiocyanatostilbene-2,2'-disulfonic acid, 4-acetamido-4'-maleimidylstilbene-2,2'-disulfonic acid, naphthalenetrisulfonic acid, dinaphthylmethanedisulfonic acid, anthraquinonedisulfonic acid and anthracenesulfonic acid. Further, metal salts of these acids may also be used.
(Binder Resin)

In order to regulate the film-forming properties of the conductive complex, the solid electrolyte of the capacitor according to the present embodiment may also include an added binder resin or cross-linking agent Examples thereof include polyesters, polyurethanes, acrylic resins, epoxy resins, polyamides, polyacrylamides and silane coupling agents.
[Solid Electrolytic Capacitor]

Next is a description of a solid electrolytic capacitor according to an embodiment of the present invention.

The structure of the solid electrolytic capacitor of this embodiment comprises basically an anode foil 11 that functions as an anode body composed of a porous body of a valve metal, a dielectric layer 12 formed by oxidation of the surface of the anode 11, a cathode foil 13*b* that functions as a cathode body, a separator disposed between the anode foil 11 and the cathode foil 13*b*, and a solid electrolyte 13*a* supported on the separator.
<Anode>

Examples of the valve metal that constitute the anode foil 11 include aluminum, tantalum, niobium, titanium, hafnium, zirconium, zinc, tungsten, bismuth and antimony. Of these, aluminum, tantalum and niobium are preferred.

Specific examples of the anode foil 11 include anodes prepared by etching an aluminum foil to increase the surface area, and then subjecting the surface to an oxidation treatment, and anodes prepared by subjecting the surface of a sintered body of tantalum particles or niobium particles to an oxidation treatment, and then forming a pellet. An anode treated in this manner has irregularities formed on the surface thereof.
<Dielectric Layer>

The dielectric layer 12 is formed, for example, by anodization of the surface of the anode foil 11 within an electrolyte solution such as an aqueous solution of ammonium adipate. Accordingly, as illustrated in FIG. 1, irregularities are formed on the surface of the dielectric layer 12 in a similar manner to the irregularities on the anode foil 11.
<Cathode>

The cathode 13 comprises a solid electrolyte layer 13*a* and a cathode foil 13*b* composed of an aluminum foil or the like formed on top of the solid electrolyte layer 13*a*.
<Separator>

Conventional natural fibers or synthetic fibers can be used favorably as the separator used in the solid electrolytic capacitor of the present embodiment. There are no particular limitations on the separator.
(Solid Electrolyte Layer)

The solid electrolyte of this embodiment comprises a hydroxy compound having a melting point of not less than 170° C. and three or more hydroxyl groups within the molecule, is disposed between the anode body and the cathode body, and is formed in contact with the anode body. A conductive polymer is preferably added to reduce the electrical resistance of the solid electrolyte layer.

The solid electrolyte of this embodiment can be formed using the solution for a solid electrolytic capacitor described above. The solid electrolyte can be formed using a method such as a coating method, printing method or dipping method.
(Water)

The solid electrolyte of the present embodiment includes water. When a solid electrolyte is formed using a conventional in-situ polymerization method, then as disclosed in Japanese Patent Laid-Open No. 2001-148331, water must be removed as thoroughly as possible. In contrast, in the capacitor of the present embodiment, including a predetermined amount of water within the solid electrolyte dramatically improves the functionality of the capacitor. In other words, in the capacitor of the present embodiment, the existence of a suitable amount of water is able to improve the capacitance and lower the ESR. It is surmised that these effects are related to the fact that the solid electrolyte of this embodiment includes a large amount of a polymer anion such as polystyrenesulfonic acid. Any amount of water not more than 7% by mass yields favorable results. The amount of water is preferably not more than 5% by mass, and more preferably 4% by mass or less. If the amount of water exceeds 7% by mass, then the film of the solid electrolyte tends to weaken, the high-temperature heat resistance of the solid electrolytic capacitor worsens, and a lack of long-term durability tends to cause the capacitance and ESR to deteriorate over time. Further, if the amount of water falls to 0.1% by mass or less, then a reduction in the capacitance is observed. In the present invention, provided the amount of water is within a range from 0.1 to 7% by mass, favorable levels of capacitance and ESR can both be achieved. Moreover, by adjusting the water content to a value of not more than 4% by mass, excellent long-term durability can be achieved.

Adjustment of the amount of water within the solid electrolyte can be performed by controlling the drying conditions or the drying atmosphere or the like. For example, drying may be conducted with the drying temperature set within a range from 100 to 30° C. Further, favorable control of the water content can also be achieved under a reduced pressure atmosphere.

Moreover, in the present invention, by adding the hydroxy compound having three or more hydroxyl groups, the water content within the solid electrolyte can be adjusted easily under less severe drying conditions, such as at a lower temperature or for a shorter period of time. In the present invention, inclusion of the hydroxy compound is preferred. For example, by adding pentaerythritol or the like, the water content can be reduced to less than half that of a solid electrolyte containing no added pentaerythritol under the same drying conditions. Being able to adjust the amount of water from an aqueous solution to an appropriate level via a low-temperature process is important in terms of the practical applicability of the process.
<Electrolyte Solution>

In the solid electrolytic capacitor of the present embodiment, following formation of the solid electrolyte layer, if required the layer may be immersed in an electrolyte solution, thereby achieving a higher capacitance through the combination of the solid electrolyte and the electrolyte solution. There are no particular limitations on the electrolyte solution provided it has a high degree of conductivity, and examples include solutions formed by dissolving conventional electrolytes in conventional solvents.

Examples of the solvent used in the electrolyte solution include alcohol-based solvents such as ethylene glycol, diethylene glycol, propylene glycol, 1,4-butanediol and glycerol, lactone-based solvents such as γ-butyrolactone, γ-valerolactone and δ-valerolactone, amide solvents such as N-methylformamide, N,N-dimethylformamide, N-methylacetamide and N-methylpyrrolidinone, nitrile solvents such as acetonitrile and 3-methoxypropionitrile, and water and the like.

Examples of the electrolyte include those comprising an anion component composed of an organic acid such as adipic acid, glutaric acid, succinic acid, benzoic acid, isophthalic acid, phthalic acid, terephthalic acid, maleic acid, toluic acid, enanthic acid, malonic acid, formic acid, a decanedicarboxylic acid such as 1,6-decanedicarboxylic acid or 5,6-decanedicarboxylic acid, an octanedicarboxylic acid such as 1,7-octanedicarboxylic acid, azelaic acid or sebacic acid, or an inorganic acid such as boric acid, a boric acid polyhydric alcohol complex compound obtained from boric acid and a polyhydric alcohol, phosphoric acid, carbonic acid or silicic acid; and a cation component composed of a primary amine (such as methylamine, ethylamine, propylamine, butylamine or ethylenediamine), a secondary amine (such as dimethylamine, diethylamine, dipropylamine, methylethylamine or diphenylamine), a tertiary amine (such as trimethylamine, triethylamine, tripropylamine, triphenylamine or 1,8-diazabicyclo(5,4,0)-undecene-7), or a tetraalkylammonium (such as tetramethylammonium, tetraethylammonium, tetrapropylammonium, tetrabutylammonium, methyltriethylammonium or dimethyldiethylammonium).

[Method for Producing Solid Electrolytic Capacitor]

Next is a description of a method for producing the solid electrolytic capacitor.

In a solid electrolytic capacitor 10 according to the present embodiment, which is produced by winding a porous anode foil 11 having a dielectric layer formed thereon, and a cathode foil 13b, with a separator having a solid electrolyte 13a supported thereon disposed therebetween, the solid electrolyte layer 13a is formed by permeation or application of a solution for a solid electrolytic capacitor, followed by drying. Examples of the method used for applying the solution for a solid electrolytic capacitor include conventional techniques such as coating, dipping and spraying. Examples of the drying method include conventional techniques such as hot-air drying.

EXAMPLES (1) Preparation of Conductive Polymer Solutions

Preparation Example 1

Preparation of Conductive Polymer Solution (I)

14.2 g of 3,4-ethylenedioxythiophene, and a solution prepared by dissolving 42.6 g of a polystyrenesulfonic acid (mass average molecular weight: approximately 300,000) in 2,000 ml of ion-exchanged water were mixed at 20° C.

With the thus obtained mixed solution undergoing constant stirring with the temperature held at 20° C., an oxidation catalyst solution containing 29.64 g of ammonium persulfate and 8.0 g of ferric sulfate dissolved in 200 ml of ion-exchanged water was added, and the resulting mixture was then stirred and reacted for 15 hours.

The resulting reaction liquid was subjected to a dialysis treatment to remove ion impurities, and an ion exchange treatment was then performed, yielding a solution containing approximately 1.6% by mass of a conductive complex of polystyrenesulfonic acid and poly(3,4-ethylenedioxythiophene) (hereinafter referred to as a PEDOT-PSS solution).

Imidazole was then added to 100 g of this PEDOT-PSS solution, yielding a conductive polymer stock solution (MB) having a pH of 7. Subsequently, 4.8 g of hydroxyethyl acrylate (HEA) and 1.6 g of pentaerythritol (PETT, melting point: 260° C.) were mixed and dispersed within 100 g of the conductive polymer stock solution, yielding a conductive polymer solution (I).

Preparation Examples 2, 3, 4

Preparation of Conductive Polymer Solutions (III), (III), (IV)

4.8 g of hydroxy ethyl acrylate was mixed with the conductive polymer stock solution (MB) from preparation example 1, and then 4.0 g of pentaerythritol (conductive polymer solution (II)), 6.4 g of pentaerythritol (conductive polymer solution (III)) or 9.6 g of pentaerythritol (conductive polymer solution (IV)) was added and dispersed, yielding a conductive polymer solution (II), a conductive polymer solution (III) and a conductive polymer solution (IV) respectively.

Preparation Example 5

Preparation of Conductive Polymer Solution (V)

6.4 g of pentaerythritol and 0.32 g of polyester were mixed and dispersed within 100 g of the conductive polymer stock solution (MB) from preparation example 1, yielding a conductive polymer solution (V).

Preparation Example 6

Preparation of Conductive Polymer Solution (VI)

4.8 g of hydroxyethyl acrylate was mixed and dispersed within 100 g of the conductive polymer stock solution (MB) from preparation example 1, yielding a conductive polymer solution (VI).

Preparation Example 7

Aminoethanol was added to 100 g of the PEDOT-PSS solution prepared in preparation example 1 to obtain a conductive polymer solution having a pH of 4. 6.4 g of pentaerythritol was then mixed and dispersed within this solution, yielding a conductive polymer solution (VII).

Preparation Example 8

Aminoethanol was added to 100 g of the PEDOT-PSS solution prepared in preparation example 1 to obtain a conductive polymer solution having a pH of 8. 6.4 g of pentaerythritol was then mixed and dispersed within this solution, yielding a conductive polymer solution (VIII).

(2) Production of Solid Electrolytic Capacitors

An etched aluminum foil (anode foil) was connected to an anode lead terminal, and was then subjected to a chemical conversion treatment (an oxidation treatment) by applying a voltage of 102 V within a 10% by mass aqueous solution of diammonium adipate. The resulting etched aluminum foil (anode foil) and an aluminum cathode foil were then wound with a cellulose separator disposed therebetween, yielding a circular cylindrical capacitor element.

(3) Evaluation of Water Content 3 g samples of each of the conductive polymer solutions used in the following examples 1 to 11 and comparative examples 1 and 2 were weighed into separate Petri dishes having a diameter of approximately 10 cm, and the conductive polymer solutions were dried using the respective drying conditions listed for examples 1 to 11 and comparative examples 1 and 2, thus preparing water content measurement samples of each of the obtained solid electrolytes (compositions).

The water content of each of the prepared solid electrolytes was measured using a coulometric titration moisture meter (CA-100) manufactured by Mitsubishi Chemical Corporation with the vaporization temperature set to 150° C.
(Evaluation of Withstand Voltage)

With the prepared solid electrolytic capacitor at room temperature, a stabilized direct current power source was used to increase the voltage from 50 V at a rate of 0.5 V/second, and the voltage at the point where the current reached 100 mA was measured and recorded as the withstand voltage.

Example 1

A capacitor element obtained in production example 1 was dipped, under reduced pressure conditions, in the conductive polymer solution (I) prepared in preparation example 1, and was then dried for 30 minutes at 150° C. in a hot air dryer. This dipping operation within the conductive polymer solution (I) was repeated a further two times, thereby forming a solid electrolyte layer between the dielectric layer and the cathode.

Next, the capacitor element with the solid electrolyte layer formed thereon was packed in an aluminum case and sealed with a sealing rubber.

Subsequently, in a voltage application step, a direct current voltage of 60 V was applied between the anode and the cathode for 60 minutes within an atmosphere at 150° C., thus yielding a solid electrolytic capacitor.

The initial values of the capacitance at 120 Hz and the ESR at 100 kHz for the prepared capacitor were measured using an LCR meter 2345 (manufactured by NF Corporation). These results are shown in Table 1. The ESR value acts as an indicator of the impedance.

In an atmosphere at 150° C., a 50 V direct current voltage was applied between the anode and the cathode for 500 hours to evaluate the heat resistance of the solid electrolytic capacitor. The change in the capacitance from the initial value is shown in Table 1. A high-temperature evaluation was performed by leaving the solid electrolytic capacitor to stand for 3 minutes in an atmosphere at 260° C.

TABLE 1

| | | Example | | | | | | |
|---|---|---|---|---|---|---|---|---|
| | | 1 | 2 | 3 | 4 | 5 | 6 | 7 |
| Additive | HEA | 3-fold | 3-fold | 3-fold | | | | |
| | PETT | 1.0-fold | 2.5-fold | 2.5-fold | 4-fold | 4-fold | 4-fold | 6-fold |
| | Polyester | | | | | | | |
| Viscosity 25° C. | mPa·s | 15.1 | 14.2 | 14.2 | 10.3 | 10.3 | 10.3 | 9.6 |
| Viscosity after 30 days storage | mPa·s | 22 | 19 | 19 | 15.4 | 15.4 | 15.4 | 12.6 |
| Drying conditions | Temperature (° C.) | 150 | 150 | 180 | 125 | 150 | 260 | 180 |
| | Time (minutes) | 80 | 80 | 80 | 80 | 30 | 10 | 60 |
| Water content | % | 1.05 | 0.95 | 0.85 | 1.10 | 0.88 | 0.20 | 0.50 |
| Capacitance | μF | 47.9 | 48.7 | 48.8 | 49.5 | 50.1 | 47.9 | 48.2 |
| ESR | mΩ | 17.8 | 16.5 | 16.2 | 14.8 | 16.8 | 16.4 | 14.2 |
| Withstand voltage | V | 108 | 110 | 110 | 110 | 113 | 105 | 115 |
| Heat resistance 260° C., 3 min | Capacitance (μF) | 48.7 | 50.1 | 49.7 | 51.9 | 52.6 | 48.5 | 49.8 |
| | ESR (mΩ) | 18.5 | 16.6 | 16.8 | 16.5 | 16.8 | 16.8 | 15.8 |
| Heat resistance evaluation | Change in capacitance (%) | −2.10 | −1.80 | −1.80 | −2.30 | −1.40 | −0.50 | −1.50 |

| | | Example | | | Comparative example | | |
|---|---|---|---|---|---|---|---|
| | | 8 | 9 | 10 | 1 | 2 | 3 |
| Additive | HEA | 3-fold | | | | 3-fold | 3-fold |
| | PETT | 4-fold | ○ | ○ | | | |
| | Polyester | | | | | | |
| Viscosity 25° C. | mPa·s | 10.1 | 10.5 | 10.4 | 16.3 | 18.5 | 18.5 |
| Viscosity after 30 days storage | mPa·s | 12.8 | 15.9 | 15.8 | 26 | 29 | 29 |
| Drying conditions | Temperature (° C.) | 180 | 180 | 180 | 150 | 150 | 100 |
| | Time (minutes) | 30 | 30 | 30 | 30 | 30 | 30 |
| Water content | % | 0.70 | 0.9 | 0.9 | 2.10 | 1.90 | 10.80 |
| Capacitance | μF | 47.9 | 49.1 | 49.0 | 48.4 | 44.5 | 48.5 |
| ESR | mΩ | 15.3 | 15.9 | 16.1 | 89 | 20.8 | 19.4 |
| Withstand voltage | V | 118 | 108 | 108 | 78 | 92 | 93 |
| Heat resistance 260° C., 3 min | Capacitance (μF) | 48.8 | 49.8 | 49.8 | 87 | 48.3 | fail |
| | ESR (mΩ) | 16.8 | 16.1 | 16.2 | 159 | 26.8 | fail |
| Heat resistance evaluation | Change in capacitance (%) | −1.90 | −1.8 | −1.8 | −12.50 | −7.90 | −13.50 |

Examples 2 and 3

Using the same method as example 1, but using the conductive polymer solution (II), drying was performed for 30 minutes at 150° C. (example 2) or 30 minutes at 180° C. (example 3), completing preparation of solid electrolytic capacitors of example 2 and example 3 respectively.

Examples 4 to 6

Using the same method as example 1, but using the conductive polymer solution (III), drying was performed for 30 minutes at 125° C. (example 4), 30 minutes at 150° C. (example 5) or 10 minutes at 260° C. (example 6), completing preparation of solid electrolytic capacitors of example 4, example 5 and example 6 respectively.

Example 7

Using the same method as example 1, but using the conductive polymer solution (IV), drying was performed for 60 minutes at 180° C. (example 7), completing preparation of a solid electrolytic capacitor of example 7.

Example 8

Using the conductive polymer solution (V) and the same method as example 1, drying was performed for 30 minutes at 150° C. (example 8), completing preparation of a solid electrolytic capacitor of example 8.

Examples 9 and 10

Using the same method as example 1, but using the conductive polymer solution (VII) (example 9) or the conductive polymer solution (VIII) (example 10), drying was performed for 30 minutes at 180° C., completing preparation of solid electrolytic capacitors of example 9 and example 10 respectively.

Comparative Example 1

Using the conductive polymer stock solution (MB) prepared in preparation example 1 and the same method as example 1, drying was performed for 30 minutes at 150° C., completing preparation of a solid electrolytic capacitor of comparative example 1.

Further, the capacitance, ESR and heat resistance were measured in the same manner as example 1. The results are shown in Table 1.

Comparative Examples 2 and 3

Using the conductive polymer solution (VI) and the same method as example 1, drying was performed for 30 minutes at 150° C. (comparative example 2) or 30 minutes at 1° C. (comparative example 3), completing preparation of solid electrolytic capacitors of comparative example 2 and comparative example 3 respectively.

Further, the capacitance, ESR and heat resistance were measured in the same manner as example 1. The results are shown in Table 1.

Other Embodiments

While the present invention has been described above using embodiments and examples, it should be understood that the statements and drawing that constitute a portion of this description are merely exemplary, and are not to be considered as limiting the invention. It is anticipated that, based on this description, various alternative embodiments, examples and operational techniques will become apparent to a person skilled in the art.

Accordingly, the present invention includes all manner of embodiments not specifically disclosed within this description.

The solid electrolytic capacitor invention according to the present application can be used in all manner of electronic devices including digital instruments. Furthermore, the method for producing a solid electrolytic capacitor and the solution for a solid electrolytic capacitor according to the present invention can be used for producing solid electrolytic capacitors for use within all manner of electronic devices including digital instruments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232889, filed on Oct. 6, 2009, which is hereby incorporated by reference herein in its entirety.

What is claimed is:

1. A solid electrolytic capacitor comprising at least an anode body composed of a porous material, a dielectric layer formed on a surface of the anode body, and a cathode body, wherein
the solid electrolytic capacitor has a solid electrolyte layer formed in contact with the dielectric layer, the solid electrolyte layer comprises at least a hydroxy compound having three or more hydroxyl groups, and the hydroxy compound has a melting point of not less than 170° C., wherein a water content within the solid electrolyte layer is adjusted to a value within a range from 0.1 to 7% by mass.

2. The solid electrolytic capacitor according to claim 1, wherein the hydroxy compound is pentaerythritol.

3. The solid electrolytic capacitor according to claim 1, wherein the solid electrolyte layer comprises one or more compounds selected from the group consisting of ether compounds, compounds having an amide group, compounds having an imide group, lactam compounds, compounds having a glycidyl group, acrylic compounds, polyesters, polyurethanes, acrylic resins, epoxy resins, polyamides, polyacrylamides and silane coupling agents.

4. The solid electrolytic capacitor according to claim 1, wherein the solid electrolyte layer comprises a conductive polymer.

5. The solid electrolytic capacitor according to claim 4, wherein the conductive polymer is a thiophene-based conductive polymer.

6. The solid electrolytic capacitor according to claim 1, having a solid electrolyte layer comprising a hydroxyl compound having three or more hydroxyl groups that is formed in contact with the cathode body.

7. The solid electrolytic capacitor according to claim 1, further comprising an electrolyte solution.

8. A solution for a solid electrolytic capacitor that is used for forming a solid electrolyte layer of a solid electrolytic capacitor, wherein
the solution for a solid electrolytic capacitor comprises at least a hydroxy compound having at three or more hydroxyl groups, and the hydroxy compound has a melting point of not less than 170° C., wherein the method comprises a step of forming the solid electrolyte by permeation of the solution for a solid electrolytic capacitor, and wherein a water content within the solid electrolyte layer is adjusted to a value within a range from 0.1 to 7% by mass.

9. A method for producing a solid electrolytic capacitor comprising at least an anode body composed of a porous material, a dielectric layer formed on a surface of the anode body, and a cathode body, wherein the method comprises a step of forming, in contact with the dielectric layer, a solid electrolyte layer comprising at least a hydroxy compound that has three or more hydroxyl groups and has a melting point of not less than 170° C., wherein the method further comprises a step of forming the solid electrolyte by permeation of the solution for a solid electrolytic capacitor, and wherein a water content within the solid electrolyte layer is adjusted to a value within a range from 0.1 to 7% by mass.

10. A solution for a solid electrolytic capacitor comprising, at least, water and/or a mixed solvent containing water, a conductive complex of a cationized conductive polymer and a polymer anion, and a hydroxy compound having a melting point of not less than 170° C., wherein a degree of acidity of the solution is adjusted to a value within a range from pH 3 to pH 13.

11. The solution for a solid electrolytic capacitor according to claim 10, wherein the hydroxy compound is pentaerythritol.

12. The solution for a solid electrolytic capacitor according to claim 10, wherein a viscosity of the solution is not more than 30 mPa·s.

13. A solid electrolytic capacitor produced by winding a porous anode foil having a dielectric layer formed thereon, and a cathode foil, with a separator having a solid electrolyte supported thereon disposed therebetween, wherein the solid electrolyte is formed by permeation of the solution for a solid electrolytic capacitor according to claim 10, wherein a water content within the solid electrolyte layer is adjusted to a value within a range from 0.1 to 7% by mass.

14. A method for producing a solid electrolytic capacitor by winding a porous anode foil having a dielectric layer formed thereon, and a cathode foil, with a separator having a solid electrolyte supported thereon disposed therebetween, wherein the method comprises a step of forming the solid electrolyte by permeation of the solution for a solid electrolytic capacitor according to claim 10, wherein a water content within the solid electrolyte layer is adjusted to a value within a range from 0.1 to 7% by mass.

* * * * *